United States Patent [19]

Waeselynck et al.

[11] 4,198,596
[45] Apr. 15, 1980

[54] DEVICE FOR DIRECT AND CONTINUOUS RECEIVING AND MEASURING OF ELECTRICAL MAGNETIC AND ACOUSTIC SIGNALS

[75] Inventors: Michel Waeselynck; Lucien Gerbel, both of Pau; René Corbefin, Toulouse, all of France

[73] Assignee: Societe Nationale Elf Aquitaine (Production), Courbevoie, France

[21] Appl. No.: 840,385

[22] Filed: Oct. 7, 1977

[30] Foreign Application Priority Data

Oct. 15, 1976 [FR] France ................... 76 31009

[51] Int. Cl.² .................. G01V 3/12; G01R 23/16
[52] U.S. Cl. ............................ 324/344; 324/335; 324/77 C; 324/77 E
[58] Field of Search ........................... 324/6–8, 324/77 B, 77 C, 77 E, 78 F; 343/5 SA; 340/15.5 CF

[56] References Cited
U.S. PATENT DOCUMENTS

| | | | |
|---|---|---|---|
| 2,268,106 | 12/1941 | Blau | 324/6 |
| 2,700,753 | 1/1955 | Peterson | 340/15.5 CF |
| 2,897,442 | 7/1959 | Wright et al. | 324/77 E |
| 2,926,304 | 2/1960 | Fromm | 324/77 E X |
| 3,119,999 | 1/1964 | Jaffe | 343/5 SA |
| 3,197,704 | 7/1965 | Simon et al. | 324/7 X |
| 3,519,926 | 7/1970 | Chandos | 324/77 E |
| 3,737,842 | 6/1973 | Bobrin | 324/77 E X |
| 3,836,960 | 9/1974 | Gehman et al. | 343/5 SA X |
| 4,010,413 | 3/1977 | Daniel | 324/6 |

OTHER PUBLICATIONS

Zhestouskii et al., "*Simple Spectrum Analyzer for Low . . . Frequencies*", Instruments and Experimental Techniques, No. 2 (Mar. 4, 1970), N.Y. USA, pp. 615, 616.

*Primary Examiner*—Gerard R. Strecker
*Attorney, Agent, or Firm*—Schwartz, Jeffery, Schwaab, Mack, Blumenthal & Koch

[57] ABSTRACT

A direct and continuous receiving and measuring device for electrical, magnetic and acoustic signals comprises an amplifier stage and a broadband filtering stage at the input, a local oscillator for supplying a reference signal, a measuring stage, a mixer to which the local oscillator and the broadband filtering stage are connected and a low frequency filtering stage connected to the mixer.

The invention also includes the process of carrying out the measurement.

15 Claims, 2 Drawing Figures

DEVICE FOR DIRECT AND CONTINUOUS RECEIVING AND MEASURING OF ELECTRICAL MAGNETIC AND ACOUSTIC SIGNALS

BACKGROUND OF THE INVENTION

The present invention is concerned with a direct and continuous receiving and measuring device for electrical, magnetic and acoustic signals and more particularly is adapted to reception or measurement of electromagnetic natural waves or waves emitted by any type of of emitter at a given power and emitted at a given frequency, for example, between 10 Hz and 250 K Hz.

It is well known that the artificial electrical currents produced by emitters arranged above ground, such as radio station transmitters or machines moving in air or in water, give rise to telluric currents in the earth's crust which add to the natural currents which, by nature, are random, i.e. they have incessant variations in their direction, sense and their intensity.

The flow of these telluric currents in the ground depends on the structure of the subsoil, i.e. in terms of the resistivity of the rocks or materials of the subsoil. Moreover it has been shown that the current density decreases exponentially as a function of the depth as the waves are propagated in the subsoil.

Thus exact measurement of the electrical and magnetic components of a given frequency wave and being propagated in the subsoil makes it possible to follow the development and passage of the wave in the subsoil and then to know the allocation and distribution of the different materials constituting the subsoil. It is equally possible to deduce the depth of penetration of this same wave therefrom.

But these continuous varying waves are at relatively low frequencies, generally between 10 Hz and 250 K Hz for electrical signal amplitudes as low as 0.04 $\mu$V/m. Thus the receivers used until now are not adapted to this dynamic range of frequencies or to signals of such a low amplitude.

In fact, devices comprising direct amplification of the signal picked up, filtering and a system of measurement may be conceived. But these known devices operate on discrete frequencies i.e. preselected frequencies and one is compelled to use a filter according to frequency to be received and this considerably limits the frequencies which may be used because the number of filters cannot be increased in an inconsidered manner without consequently increasing the dimension of the receiver and its cost of production.

Moreover, it is difficult to make a narrow filter which will be stable when the temperature varies between $-15°$ C. and $+50°$ C., particularly at low frequency.

Finally, it may be understood that a device constructed as a function of discrete frequencies cannot operate for the frequencies situated outside the predetermined values.

Of course there are receiving devices operating at high frequency or at the very least at frequencies of the order of megahertz and in which there is continuous scanning and measurement of a relatively large band of frequencies. Nevertheless the high-frequency filters used are pass-band filters and the variations in the overvoltage coefficient owing to the variations in temperature cause a variation in the gain on the one hand and a variation in the central frequency of the band on the other hand. It is thus that a change of 1 Hz, which is negligible when working at high frequency becomes unsuitable at very low frequencies because, for a frequency of 10 Hz for the signals which are of interest, there would be the risk of adjusting the filter to 9 or 11 Hz which would find expression in non-reception of the signals and large errors in the amplitudes and phases of the signals measured.

SUMMARY OF THE INVENTION

It is an object of the present invention to mitigate the disadvantages mentioned above and to provide a direct and continuous receiving and measuring device for natural or artificial signals of any type, especially electrical signals, magnetic signals or acoustic signals which make scanning all of the frequencies of a given spectrum possible and to choose the most favourable and the most characteristic of the phenomenon studies.

According to a first aspect of the invention, there is provided a direct and continuous receiving and measuring device for electrical magnetic or acoustic signals comprising an amplifier stage and a broadband filtering stage at the input, a local oscillator for supplying a reference signal, a measuring stage, a mixer to which said local oscillator and said broadband filtering stage are connected and a low frequency filtering stage connected to said mixer.

Further to this aspect of the invention, there is provided a direct and continuous receiving and measuring device for electrical, magnetic or acoustic signals comprising an input amplifier stage, at least one broadband filtering stage fed by said input amplifier stage, a mixer connected to said broadband filtering and to a local oscillator, a low frequency filtering stage connected to the output of said mixer and a measuring stage connected to said low frequency filtering stage.

According to a second aspect of the invention, there is provided a process for measuring electrical magnetic or acoustic signals, said process comprising picking up said signals, receiving said signals in a receiver, transposing said signals into low frequency signals, selecting desired frequency decades by means of low frequency filters and processing said low frequency filtered signals to provide the desired measurement.

Further to this aspect of the invention, there is provided a measuring process for measuring the distribution of the impedance of a medium, said process comprising receiving on a receiver natural or artificial waves propagating themselves in the medium and detected by the pick-ups, selecting the desired frequency decades selectively filtering for said selected decades after transposition to low frequency, and treating said low-frequency filtered signals to measure the output voltage of each said pick-up and the phase difference between any two of the said pick-ups by averaging out amplitudes and phases and bringing the values obtained back to the output of said pick-ups.

BRIEF DESCRIPTION OF THE DRAWINGS

The invention will now be described in greater detail, by way of example, with reference to the drawings, in which.

DESCRIPTION OF THE PREFERRED EMBODIMENTS

Figure 1:
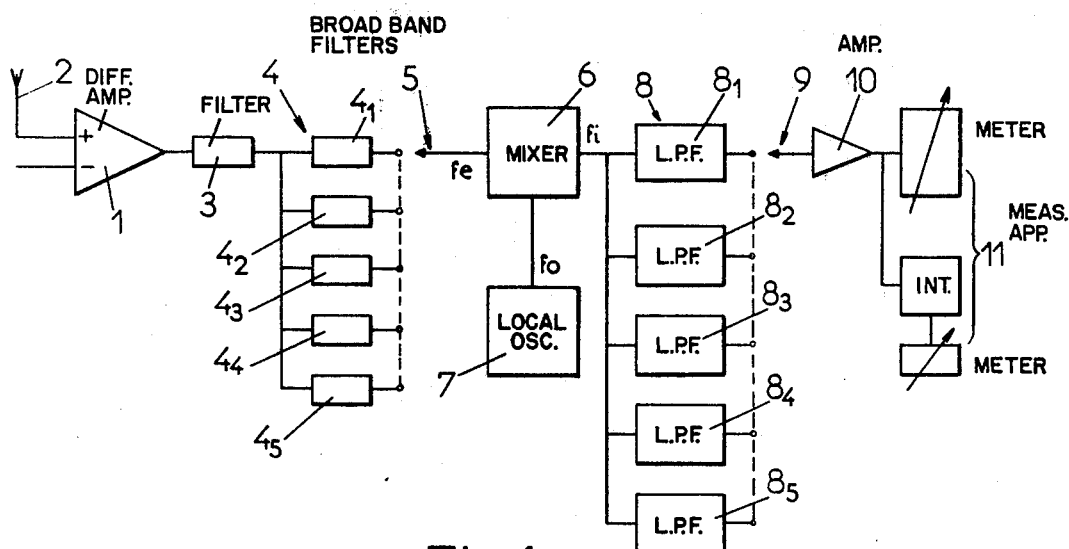
FIG. 1 is a schmatic block diagram giving an overall view of different constituent elements of a device according to the invention.

The device in accordance with a preferred embodiment of the invention is of the type comprising an input amplifier stage and at least one broadband frequency filtering stage available at the input, a local oscillator supplying a signal at a reference frequency and a measuring stage, characterized in that, among other things, it comprises a low-frequency filtering stage connected to a mixer placed between the broadband filtering stage and the local oscillator.

An advantage of this resides in the fact that, working at low frequency makes it possible to study relatively low-frequency phenomena, such as the natural electromagnetic waves being propagated in the earth's subsoil.

In accordance with another characteristic, the spectrum of the frequencies available at the input is divided into a certain number of low-frequency decades, each of the low-frequency filters being allocated to one of the decades and operating in narrow band.

In accordance with another characteristic, the local oscillator is of the type comprising a quartz oscillator connected to a first loop comprising a phase comparator, a voltage controlled oscillator and a divider in series, the said local oscillator being characterized in that a second loop is connected to the output of the voltage controlled oscillator, the second loop comprising at least a second phase comparator and a second voltage-controlled oscillator the squared wave signal output of which is applied to a divider connected to the second phase comparator.

This makes it possible to have a sinusoidal signal at the output of the local oscillator, this signal retaining its linear characteristics and having a distortion rate less than 3% so as not to be face to face with harmonic pulsation at lower levels. Moreover, relatively reduced response times are obtained so as to reduce the measurement time.

In accordance with another characteristic, the frequency spectrum available at the input is divided into a certain number of low-frequency decades, for example five, each of the low-frequency filters operating in narrow band and being allocated to one of the decades which may operate in narrow or normal band, each low-frequency filter defining a narrow band for its own decade and a normal band for the preceding decade.

Thus all the frequencies of the spectrum may be scanned continuously and it may be determined if the selected and shown frequency is present at the input of the device. Confirmation of the identity between the frequency shown and the frequency supposed to exist at the input is carried out be means of a verifier switch.

In a particular application of the device in accordance with the invention, it can be used to measure distribution of the impedance of a medium, a process characterized in that it receives natural or artificial waves in a receiver which are being propagated in the medium and detected by pick-ups; in that it selects the decades of the frequency which are of interest; in that selective filtering is carried out for the decades chosen after transposition to low frequency; in that the said low-frequency filtered signals are treated so as to measure the output voltage of each pick-up and the difference in phase between any two of the pick-ups, treatment of the low-frequency filtered signals consisting in averaging out the amplitudes and phases and bringing the values obtained to the output of the pick-ups.

In magnetotelluric terms, the natural or artificial waves are electromagnetic by nature and are used to determine the distribution of the resistivity of the subsoil.

Referring now to the drawings, a device according to the invention comprises a symmetrical or an asymmetrical input amplifier depending on the pick-ups used, the inputs of which are connected to the pick-ups which have as their function to detect the particularly electrical, magnetic or acoustic signals which are being propagated at the surface of the soil, the said signals having a frequency varying in any band, for example, between 10 Hz and 250 K Hz. In general, adaptable impedance amplifiers known per se and not shown are placed between the pick-ups designated in their entirety by the reference 2, made up of a receiving antenna and the differential amplifier 1.

Rejectors 3 which elimate the continuous components of the signals, such as the 50 Hz and 60 Hz frequencies and their third harmonics, i.e. 150 Hz and 180 Hz, are located at the output of the input amplifier 1.

According to another feature of the invention the frequency band 10 Hz–250 K Hz in which we are interested is divided into five frequency decades, for example 10 Hz–99.9 Hz, 100 Hz–999 Hz, 1000 Hz–9999 Hz; 10 K Hz–99.9 K Hz, and 100 K Hz–250 K Hz. In order to eliminate the undesirable frequencies when one is operating in one of the above ranges, high-frequency filters 4 which are five in number, the first filter $4_1$ covering at least 10 Hz–100 Hz, the second covering 100 Hz–1000 Hz and so on, are arranged at the output of the rejectors 3.

Figure 2:
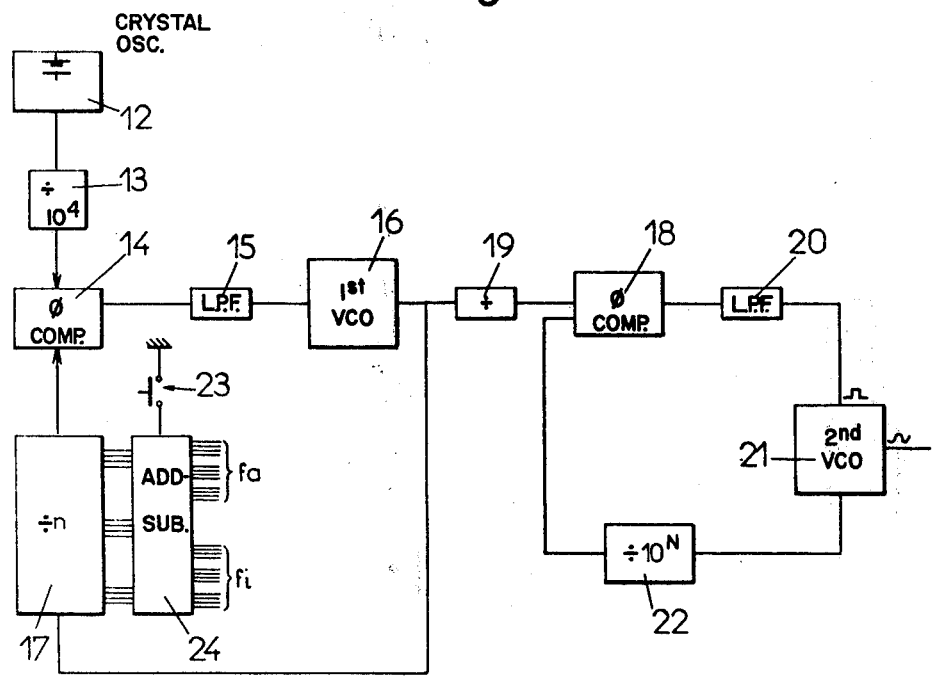
FIG. 2 is a block diagram of a local oscillator in accordance with the invention.

A selector shown schematically and designated by the reference 5 is placed between the chain of filters 4 connected in parallel and a mixer 6. A local oscillator 7, whose schematic detail is shown in FIG. 2, supplies a signal at a frequency $f_o$ which is applied to the input of the mixer 6 which receives a reference signal on its other input at a frequency $f_e$ which is one of the frequencies available at the input of the input amplifier 1. The mixer 6 is in fact an analog multiplier which carries out multiplication of the signal supplied by the local oscillator 7 and representative of the frequency $f_o$ with the signal which has come from the selector 5 at the frequency $f_e$. At the output of the mixer 6 a signal at the frequency $f_i = f_e - f_o$ is obtained which is of the type $1/K\, V_e \sin w_e t \times V_o \sin w_o t$. This formula may again be written in the form:

$$\frac{V_o}{K}\left[\frac{V_e}{2} \sin(w_e - w_o)t\right] + \frac{V_o}{K}\left[\frac{V_e}{2} \sin(w_e + w_o)t\right] \quad (1)$$

Thus at the output of the mixer a signal is obtained of an amplitude proportional to the input voltage $V_e$ and $V_o$ is a constant because the local oscillator 7 supplies a constant amplitude whatever its oscillation frequency.

The frequencies $f_3$ being able to vary in the previously determined decades, five parallel low-pass filters 81 to 85 are connected to the mixer 6.

In each decade of preselected frequencies two selectivities or working bands may be obtained (narrow selectivity or normal selectivity) in accordance with the Table below:

| Decades | Frequencies | Selectivities | |
|---|---|---|---|
| | | Narrow | Normal |
| 1 | 10 Hz–99.9 Hz | 0.2 Hz | 2 Hz |
| 2 | 100 Hz–999 Hz | 2 Hz | 20 Hz |
| 3 | 1000 Hz–9990 Hz | 20 Hz | 200 Hz |
| 4 | 10 K Hz–99.9 K Hz | 200 Hz | 2 K Hz |
| 5 | 100 K Hz–250 K Hz | 2 K Hz | |

It is evident from this Table that the receiver can choose between two emitters the frequencies of which are very close.

If the frequency to be isolated is 300 Hz, for example, the filter $8_2$ allotted to the decade 2 can operate between 299 Hz–301 Hz for the narrow selectivity and between 290 and 310 Hz for the normal selectivity while obviously not taking into account the reflected frequency. If there is another emitter of the frequency 295 Hz, only the narrow selectivity makes it possible to isolate the frequency of 300 Hz because, for normal selectivity there is superposition of the two frequencies 300 Hz and 295 Hz.

The choice of the decade to be used is a function of the frequency to be isolated. This selection is carried out by means of another selector with the reference 9 which is connected to an amplifier 10, the output of which is connected to a measurement apparatus 11 of the type comprising a detector without a threshold so as to be linear, and an integrator constituted by a lowpass filter, this is in order to have a voltage proportional to the mean value of the amplitude of the input signal and constituted by a needle or digital indicator or both.

The local oscillator 7, FIG. 2, comprises a quartz oscillator 12 the frequency of which is the reference frequency, a divider 13 by $10^4$ which applies a reference frequency to the input of a phase comparator 14 which is equal for example to 100 Hz if the frequency of the quartz oscillator is 1 M Hz.

A loop comprising a low-pass filter 15, a voltage-controlled oscillator 16 and a divider by n 17 which is programmable is connected to this comparator 14, the low-pass filter 15 having to supply, at the output, a continuous loop error voltage.

If the divider by n is between 100 and 999, then the frequency supplied by the oscillator 16 is between 10 K Hz and 99.9 K Hz.

A second loop is connected to the first and also comprises a phase comparator 18 connected to the oscillator 16 via a divider by $10^3$ 19, a low-pass filter 20, a voltage-controlled oscillator 21, the squared wave output of which is connected to a divider by $10^N$ 22, N being between 0 and 4 in accordance with the selected decade. In addition, the oscillator 21 supplies a sinusoidal signal at constant amplitude, said sinusoidal signal being applied to the mixer 6.

From the above, it can be seen that the local oscillator should supply a signal of the frequency $f_o = f_e - f_i$ where $f_e$ is the frequency of the input signal and $f_i$ is the intermediate frequency and is equal to half the cut off frequency of the low-pass filter which has been automatically selected. After filtering, only the first term is obtained in $f_e - f_o$ and one is able to see that two $f_e$ are possible for the same $f_o$ and the same $f_i$, i.e. $f_{e1} = f_o + f_i$ or $f_{e2} = f_o - f_i$.

The receiver does not know how to isolate the reflected frequency $f_o - f_i$ of the actual frequency $f_o + f_i$. To this end the device comprises an automatic verifier switch 23 which shifts the frequency of the local oscillator 7 from $2f_i$. If, when verifying, reception is not modified, then this is because the actual frequency corresponding to a frequency shown $f_1$ was obtained.

If reception is modified it is necessary to lower the frequency shown from 2 $f_i$. In order to do this a decimal coded binary adder-subtractor 24 is used one input of which receives the frequency $f_a$ shown and the other $f_i$ which is a function of the chosen selectivity and of the type of signal received, according to whether they are artificial or natural.

The device previously described can operate in accordance with a search mode or a synthesized mode which implies a generator synthesizer made up of the local oscillator of the device.

For natural signals which give a continuous audible tone in the two first decades, a frequency $f_a$ which has been preselected for example 328 Hz is displayed on the control synthesizer of the local oscillator, said frequency being transmitted to the divider 17 by means of the decimal coded binary adder subtractor 24. In narrow selectivity and for the second decade, the value of $f_i$ is 1 Hz from where it follows that the divider n is equal to 327. The phase comparator 14 is thus acted on at one input by a frequency of 100 Hz and at the other input by another frequency of 100 Hz for a quartz frequency of 1 M Hz and a value of $10^4$ shown at the divider 13. In order to determine whether the shown frequency is the reflected frequency or the actual frequency the verifier 23 is switched, one position of which corresponds to the value $f_e - f_i$ and the other to the value $f_e + f_i$. If in the two positions of the switch 23 the indication remains the same then the frequency shown is the actual frequency, this frequency being present at the input. If on the contrary the indication is modified, the frequency shown is reduced by a value equal to 2 $f_i$ so as to recentre on the filter cut off frequency and eventually the verification is restarted for the purpose of verification. The gain values are then controlled so as to be outside saturation. These controls having been carried out the signal or signals supplied by the low-frequency filtering stage 8 are amplified by the amplifier 10 and then converted into a voltage, possibly rectified and integrated in an interval of time which is a function of the decade in which the shown frequency $f_a$ is contained.

Digital voltmeters incorporated in the measuring stage show the voltage at the end of integration which is representative of the output voltage of the pick-ups i.e. a voltage which takes the different fixed or variable gains affecting the integrated signal into consideration.

For the radio signals it is possible to operate directly by the synthesized method as described previously when the frequency to be shown corresponds to that from a known frequency transmitter.

When the frequency from the transmitter is not known, the search mode is used at normal selectivity. In order to do this a frequency selector is activated until a continuous audible tone has been obtained on earphones associated with a voltage-frequency converter, the audible tone corresponding to a frequency which has been derived. Then the synthesized mode is used by setting the frequency thus derived on the synthesizer.

Another advantage of the device in accordance with the invention is to permit calibration. To this end, equal frequencies with respect to 25 Hz for decade 1, 250 Hz for decade 2, 2500 Hz for decade 3, 25 K Hz for decade 4 and 250 K Hz for decade 5 are set on the synthesizer.

A calibration output connected to the synthesizer is connected in parallel to each of the input amplifiers. For appropriate gain control, the digital voltmeters receiving the integrated signals must supply a voltage equal to 800 μV±1 dB if the device is correctly controlled and the relationship between the derived voltages at the input of two of the amplifiers should be close to 0.4 dB in this case.

It will be understood that the above description of the present invention is susceptible to various modification changes and adaptations.

What is claimed is:

1. A direct and continuous receiving and measuring device for electrical, magnetic or acoustic signals comprising:
   pick-up means for picking up said electrical, magnetic or acoustic signals;
   first filtering means having an input connected to said pick-up means and dividing the frequency range provided by said pick-up means into a plurality of frequency subranges, each frequency subrange being selected by a band-pass filter;
   first selector means adapted to be connected to the output of said band-pass filters;
   local oscillator means comprising a quartz oscillator delivering a reference frequency, a circuit loop comprising in series a phase comparator having first and second inputs and an output and connected by said first input to said quartz oscillator, a voltage controlled oscillator connected to the output of said phase comparator and a divider connected between an output of said voltage controlled oscillator and said second input of said phase comparator, said circuit loop further comprises a low-pass filter connected between the phase comparator and the voltage controlled oscillator and delivering an error signal to lock the voltage controlled oscillator on or close to the frequency to be detected;
   mixing means connected to said output of said voltage controlled oscillator;
   second filtering means comprising a plurality of low-pass filters mounted in parallel, an input of said second filtering means being connected to an output of said mixing means;
   second selector means adapted to be connected to an output of said low-pass filters of said second filtering means; and
   measuring means connected to said second selector means for measuring the value of the signals detected by the pick-up means.

2. A device as claimed in claim 1, further comprising a decimal coded binary adder-subtractor associated with said divider of said circuit loop, said adder-subtractor having first and second inputs and receiving the value of a predetermined frequency of interest on said first inputs and receiving a frequency provided from the output of said mixing means on said second inputs.

3. A device as claimed in claim 2, further comprising a verifier switch means associated with said decimal coded binary adder-subtractor for verifying whether the predetermined frequency of interest is present at the second input of said phase comparator.

4. A device as claimed in claim 1, wherein said second filtering means comprises as many low-pass filters as band-pass filters of said first filtering means.

5. A device as claimed in claim 1, wherein each band-pass filter of the first filtering means can operate in narrow band and normal band, the normal band of one said band-pass filters being the narrow band for the next adjacent band-pass filter.

6. A device as claimed in claim 1, wherein said local oscillator means constitutes a generator which, for each band-pass filter, supplies a predetermined frequency or its multiples by 10 at a constant voltage for verifying the calibration of the modes of measuring for each band-pass filter.

7. A direct and continuous receiving and measuring device for electrical, magnetic or acoustic signals comprising:
   a pick-up means for picking up said electrical, magnetic or acoustic signals;
   first filtering means having an input connected to said pick-up means and dividing the frequency range provided by said pick-up means into a plurality of frequency subranges, each frequency subrange being selected by a band-pass filter;
   first selector means adapted to be connected to the output of said band-pass filters;
   local oscillator means comprising a quartz oscillator delivering a reference frequency, and first and second circuit loops, said first circuit loop comprising in series a first phase comparator having first and second inputs and an output connected by said first input to said quartz oscillator, a first voltage controlled oscillator connected to the output of said first phase comparator and a first divider connected between an output of said first voltage controlled oscillator and the second input of said phase comparator, said second loop comprising at least a second phase comparator connected to the output of said first voltage controlled oscillator and a second voltage controlled oscillator having an output;
   mixing means connected to said output of said second voltage controlled oscillator;
   second filtering means comprising a plurality of low-pass filters mounted in parallel, an input of said second filtering means being connected to an output of said mixer means;
   second selector means adapted to b connected to an output of said low-pass filters of said second filtering means; and
   measuring means connected to said second selector means for measuring the value of the signals detected by the pick-up means.

8. A device as claimed in claim 7, wherein each first and second circuit loop further comprises a low-pass filter connected between the respective first and second phase comparator and the voltage controlled oscillator and delivering each an error signal to lock the respective voltage controlled oscillator on or close to a reference frequency.

9. A device as claimed in claim 7, further comprising a decimal coded binary adder-subtractor associated with said divider of said first circuit loop, said adder-subtractor having first and second inputs and receiving the value of a predetermined frequency of interest on said first inputs and receiving a frequency provided from the output of said mixing means on said second inputs.

10. A device as claimed in claim 7, further comprising a verifier switch means associated with said decimal coded binary adder-subtractor for verifying whether the predetermined frequency of interest is present at the second input of said first phase comparator.

11. A device as claimed in claim 7, further comprising a divider connected between said first voltage controlled oscillator and said second phase comparator.

12. A device as claimed in claim 7, further comprising a low-pass filter placed between said phase comparator and said voltage controlled oscillator in each of said respective first and second circuit loops of said local oscillator means.

13. A device as claimed in claim 7, wherein said second filtering means comprises as many low-pass filters as band-pass filters of said first filtering means.

14. A device as calimed in claim 7, wherein each band-pass filter of the first filtering means can operate in narrow and normal band, the normal band of one said band-pass filters being the narrow band for the next adjacent band-pass filter.

15. A device as claimed in claim 7, wherein said local oscillator means constitutes a generator which, for each band-pass filter, supplies a predetermined frequency or its multiples by 10 at a constant voltage for verifying the calibration of the modes of measuring for each band-pass filter.

* * * * *